(12) United States Patent
Higuchi (10) Patent No.: US 6,339,273 B1
(45) Date of Patent: Jan. 15, 2002

(54) SMALL-SIZE MOTOR (75) Inventor: Daisuke Higuchi, Nagano (JP)

(73) Assignee: Kabushiki Kaisha Seiki Seisakusho, Nagano (JP)

( * ) Notice: Subject to any disclaimer, the term of this patent is extended or adjusted under 35 U.S.C. 154(b) by 0 days.

(21) Appl. No.: 09/527,304

(22) Filed: Mar. 16, 2000

(30) Foreign Application Priority Data

Mar. 17, 1999 (JP) ............................................. 11-071418
Mar. 17, 1999 (JP) ............................................. 11-071421

(51) Int. Cl.$^7$ ................................................ H02K 5/00
(52) U.S. Cl. .................... 310/91; 310/67 R; 360/98.08; 360/99.05; 360/98.07
(58) Field of Search ................................ 310/67 R, 91, 310/42; 360/99.04, 99.05, 99.08, 98.07

(56) References Cited

U.S. PATENT DOCUMENTS

| 5,245,235 A | * | 9/1993 | Nagai et al. | 310/67 R |
| 5,254,895 A | * | 10/1993 | Koizumi | 310/156 |
| 5,410,201 A | * | 4/1995 | Tanaka et al. | 310/68 B |
| 5,834,868 A | * | 11/1998 | Yoshikawa et al. | 310/67 R |
| 5,969,448 A | * | 10/1999 | Liu et al. | 310/90 |
| 6,040,649 A | * | 3/2000 | Horng | 310/91 |
| 6,144,124 A | * | 11/2000 | Nakagawa et al. | 310/67 R |

* cited by examiner

Primary Examiner—Tran Nguyen
(74) Attorney, Agent, or Firm—Sughrue Mion, PLLC (57) ABSTRACT A shaft having a diameter A is press-fitted into the central hole of the boss. A tapered portion is formed around one end of the shaft, which is inserted to the center hole, such that a dimension in the extending direction of the shaft is R. The boss includes a cylindrical recess formed concentrically with the center hole on one end face thereof facing a side from which the shaft is inserted such that a dimension in the extending direction of the center hole thereof is larger than R, and such that a diameter thereof is $A<B \leq 1.05A$. The cylindrical recess includes a first side wall linearly extending from the end face of the boss and a second side wall subsequent to the first side wall, which is tapered inwardly in order to serve as an insertion guide member against which the tapered portion of the shaft is to be abutted when the shaft is inserted into the center hole. A wall member is formed on one end face of the boss so as to face the bearing with a gap having a predetermined width in between for blocking lubricant oil splashed from a sintered oil-contained bearing for supporting the shaft.

6 Claims, 6 Drawing Sheets

PRIOR ART

100

SMALL-SIZE MOTOR

BACKGROUND OF THE INVENTION

The present invention relates to a small-size motor which is suitable for rotating CD, DVD, MD, or CD-ROM, DVD-ROM, and other various types of information recording discs (referred to simply as "discs"), and applicable to other various uses.

Figure 8:
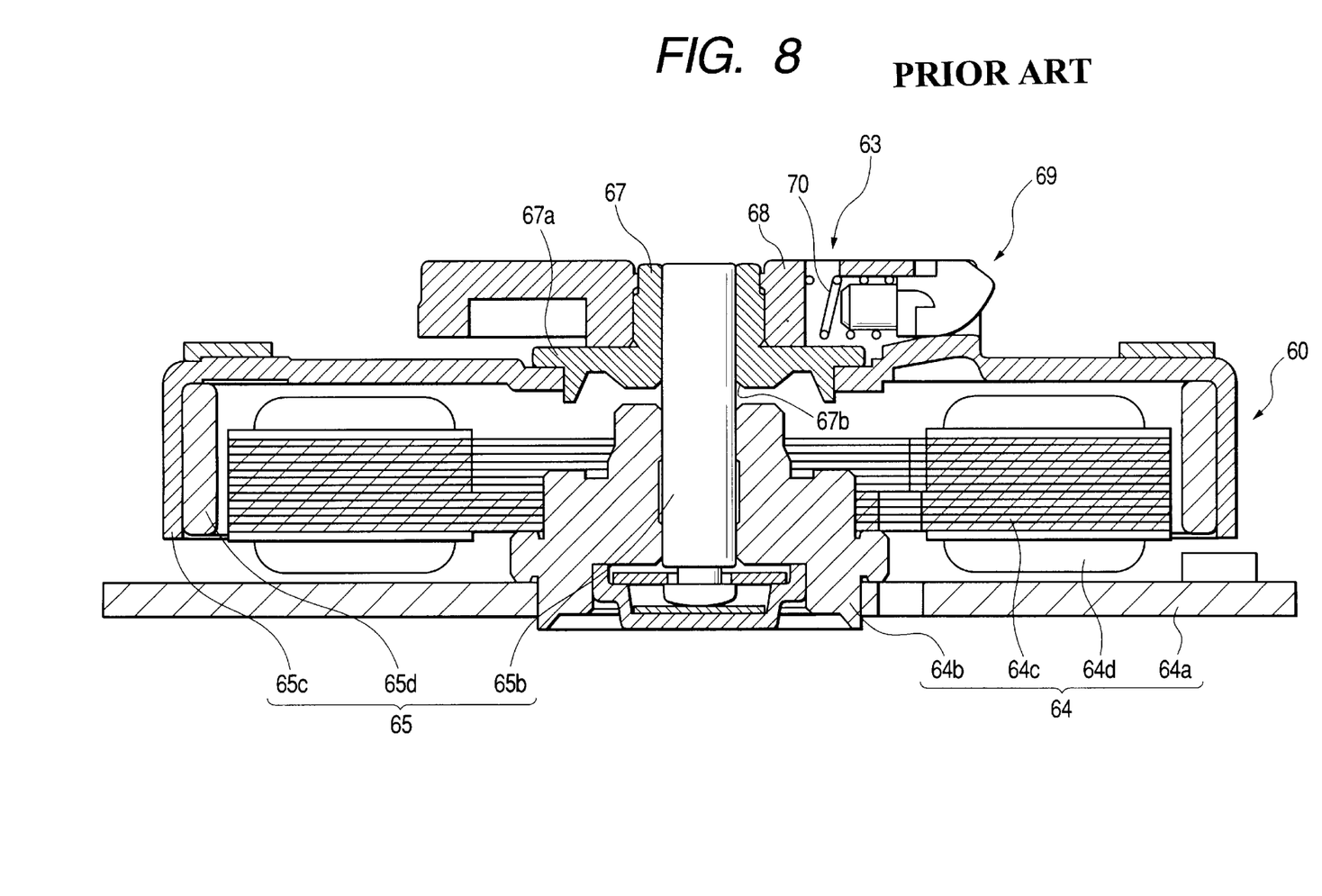
FIG. 8 is a side view showing a related small-size motor.

An example of a disc drive motor is shown in FIG. 8. As shown, a motor 60 is generally composed of a stator section 64 and a rotor section 65. The stator section 64 includes a base board 64a, a sintered oil-contained bearing 64b fastened to the base board 64a, a stator core 64c which is fastened to the outer circumferential face of the sintered oil-contained bearing 64b while being arranged coaxially with the bearing, and a coil winding 64d wound around protruding poles of the stator core 64c.

The rotor section 65 includes a rotary shaft 65b rotatably supported with the aid of the sintered oil-contained bearing 64b, a cup-shaped rotor case 65c which is coupled to the rotary shaft 65b so as to rotate together with the latter, and an annular rotor magnet 65d fastened to the inner circumferential face of the rotor case 65c.

A thick, annular boss 67 with a disc-like flange 67a formed therearound is fitted into the central portion of the rotor case 65c. The rotary shaft 65b is press-fitted into a center hole of the annular boss 67. With this structure, the rotor case 65c is coupled to the rotary shaft 65b with the annular boss 67 intervening therebetween, whereby the rotor case and the rotary shaft are rotated together.

A tapered portion 67b is formed around the lower end of the center hole of the annular boss 67. The tapered portion 67b is formed so as to assist the press-fitting of the rotary shaft 65b into the center hole of the annular boss 67.

A chucking mechanism 63 is provided around a portion of the rotary shaft 65b, which is extended above the upper face of the rotor case 65c. The chucking mechanism 63 is generally formed with a fitting member 68 to be fitted into the center hole of the disc, clamping members 69 provided at a plurality of locations on the outer circumferential face of the fitting member 68, and a plurality of urging members 70 for radially urging the clamping members 69 respectively.

Some recent technical requirements are to thin the motor and to improve a shock resistance of the motor. This necessitates increase of a coupling force of the rotary shaft 65b to the annular boss 67.

Figure 9:
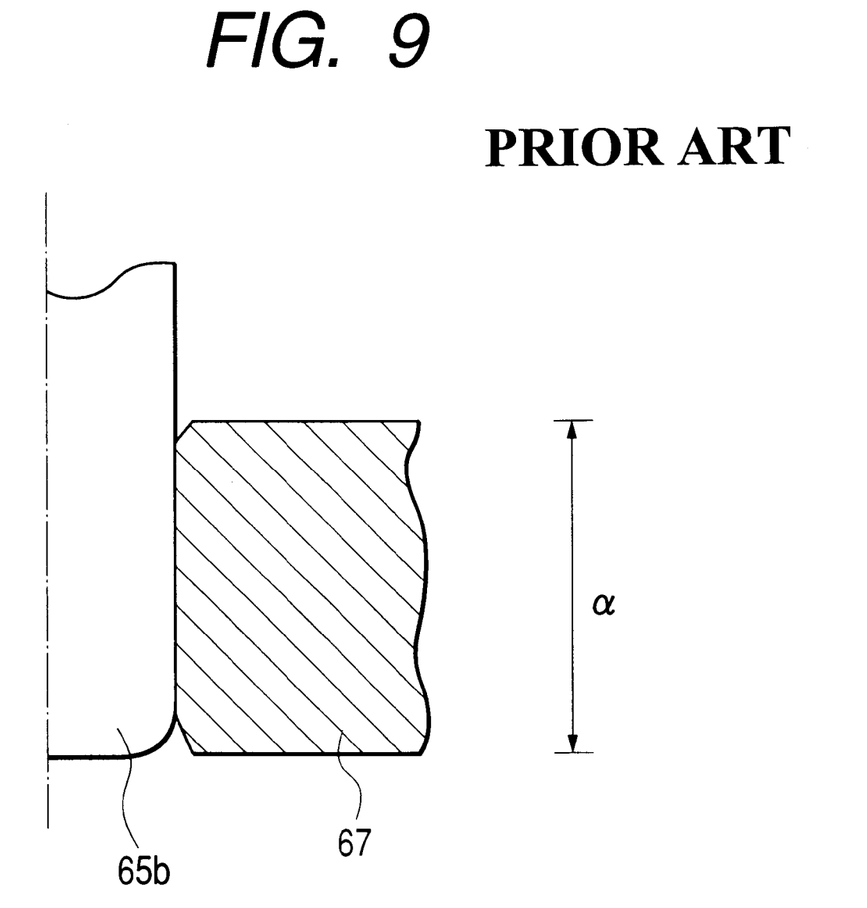
FIG. 9 is a section view showing a shaft press-fitted into a boss in the related mall-size motor.

A possible approach to increase the coupling force of the rotary shaft 65b with the annular boss 67 is to increase a length α of the center hole of the annular boss 67 as viewed in the axial direction as shown in FIG. 9. However, this coupling-force increasing approach is defective in that if the length α of the center hole of the annular boss 67 is increased, it is impossible to thin the motor.

Another possible approach to increase the coupling force is that the inside diameter of the center hole of the annular boss 67 is selected to be smaller than the outside diameter of the rotary shaft 65b, and an overlap width of press-fitting of the rotary shaft to the boss is increased. However, this approach is defective in that it is difficult to secure the perpendicularity of the rotary shaft to the boss at the time of the press fitting, and it will cause the perpendicularity of the boss to degrade.

A further possible approach is that a groove is formed around the outer circumferential face of the rotary shaft 65b where it is in contact with the center hole of the annular boss 67, and is filled with adhesive, whereby the rotary shaft 65b is bonded to the center hole of the annular boss 67. However, this approach is defective in that the workability is impaired, and the coupling force of the rotary shaft 65b to the annular boss 67 varies depending on a variation of the amount of adhesive.

The coupling of the rotary shaft 65b with the annular boss 67 by welding also suffers from problems of cost increase and limitation of a kind of material that may be used.

Generally, a sintered oil-contained bearing is used for the bearing of the motor. As shown in FIG. 8, the sintered oil-contained bearing 64b is impregnated with lubricant oil. The lubricant oil fills a gap between the inner circumferential face of the sintered oil-contained bearing 64b and the outer circumferential face of the rotary shaft 65b. With presence of the lubricant oil, the rotary shaft 65b is smoothly rotatable. The lubricant oil in the gap oozes from the upper end of the sintered oil-contained bearing 64b. In the thinned motor, the exuded lubricant oil is likely to reach the lower end of the boss 67. When the oil reaches the lower end of the boss 67, part of the lubricant oil is radially splashed along the end face of the boss 67 by a centrifugal force generated.

The splashing of the lubricant oil results in reduction of the amount of the lubricant oil in the gap, and hence in reduction of the lifetime of the bearing. Further, the splashed oil soils related parts of the motor. A gap between the upper end of the sintered oil-contained bearing 64b and the end face of the annular boss 67 may be increased so as to prevent the lubricant oil oozing from the upper end of the sintered oil-contained bearing 64b from reaching the boss 67. In this case, a dimension of the motor in the axial direction is increased. This fact makes it impossible to thin the motor.

SUMMARY OF THE INVENTION

The present invention is made to solve the problems of the related techniques, and has a first object to provide a small-size motor which is capable of improving the perpendicularity of the boss to a shaft to achieve the thinning of the motor.

The invention has a second object to provide a small-size motor which, to thin the motor, prevents the splashing of the lubricant oil and impregnates again the sintered oil-contained bearing with the oozing lubricant oil.

In order to achieve the above objects, according to the present invention, there is provided a motor comprising:
 a boss having a center hole; and
 a shaft press-fitted into the center hole, a diameter of which is A,
  wherein a tapered portion is formed around one end of the shaft, which is inserted to the center hole, such that a dimension in the extending direction of the shaft is R; and
  wherein the boss includes a cylindrical recess formed concentrically with the center hole on one end face thereof facing a side from which the shaft is inserted such that a dimension in the extending direction of the center hole thereof is larger than R, and such that a diameter thereof is A<B≦1.05A.

Preferably, the cylindrical recess includes a first side wall linearly extending from the end face of the boss and a second side wall subsequent to the first side wall, which is tapered inwardly in order to serve as an insertion guide member against which the tapered portion of the shaft is to be abutted when the shaft is inserted into the center hole.

With this structure, the perpendicularity of the shaft to the boss is secured when the shaft is press-fitted into the boss, without increasing the axial length of the center hole of the boss, whereby motor may be thinned.

Preferably, a caulking member is provided on at least one end face of the boss so as to surround the center hole, which is to be compressed onto the shaft inserted into the center hole.

When comparing the motor structure in which the shaft is simply press-fitted into the center hole of the boss, a coupling force of the shaft with the boss may be increased without increasing the axial length of the center hole of the boss. Therefore, thinning of the motor and improvement of the motor shock resistance are both achieved.

According to the present invention, there is also provided a motor comprising:

a boss having a center hole;

a shaft press-fitted into the center hole;

a sintered bearing for supporting the shaft, in which lubricant oil is contained;

a holder for holding the bearing; and a wall member formed on one end face of the boss so as to face the bearing with a gap having a predetermined width in between for blocking the lubricant oil splashed from the bearing.

Preferably, the blocking wall member extends in a direction of which the center hole extends so as to surround an outer circumferential face of the bearing. The gap between the blocking wall member and the outer circumferential face of the bearing is determined to such an extent that the splashed lubricant oil attached to the blocking wall and depended therefrom can adhere again onto the outer circumferential wall of the bearing.

Therefore, if the lubricant oil reaches the end face of the boss, the blocking wall member prevents the lubricant oil from splashing to the related portions of the motor. If the blocking wall member is formed on the boss so as to confront with the upper end face of the bearing. The dimension between the upper end of the bearing and the end face of the boss is reduced, and hence the thinning of the motor is achieved.

DETAILED DESCRIPTION OF THE PREFERRED EMBODIMENTS

Figure 1:
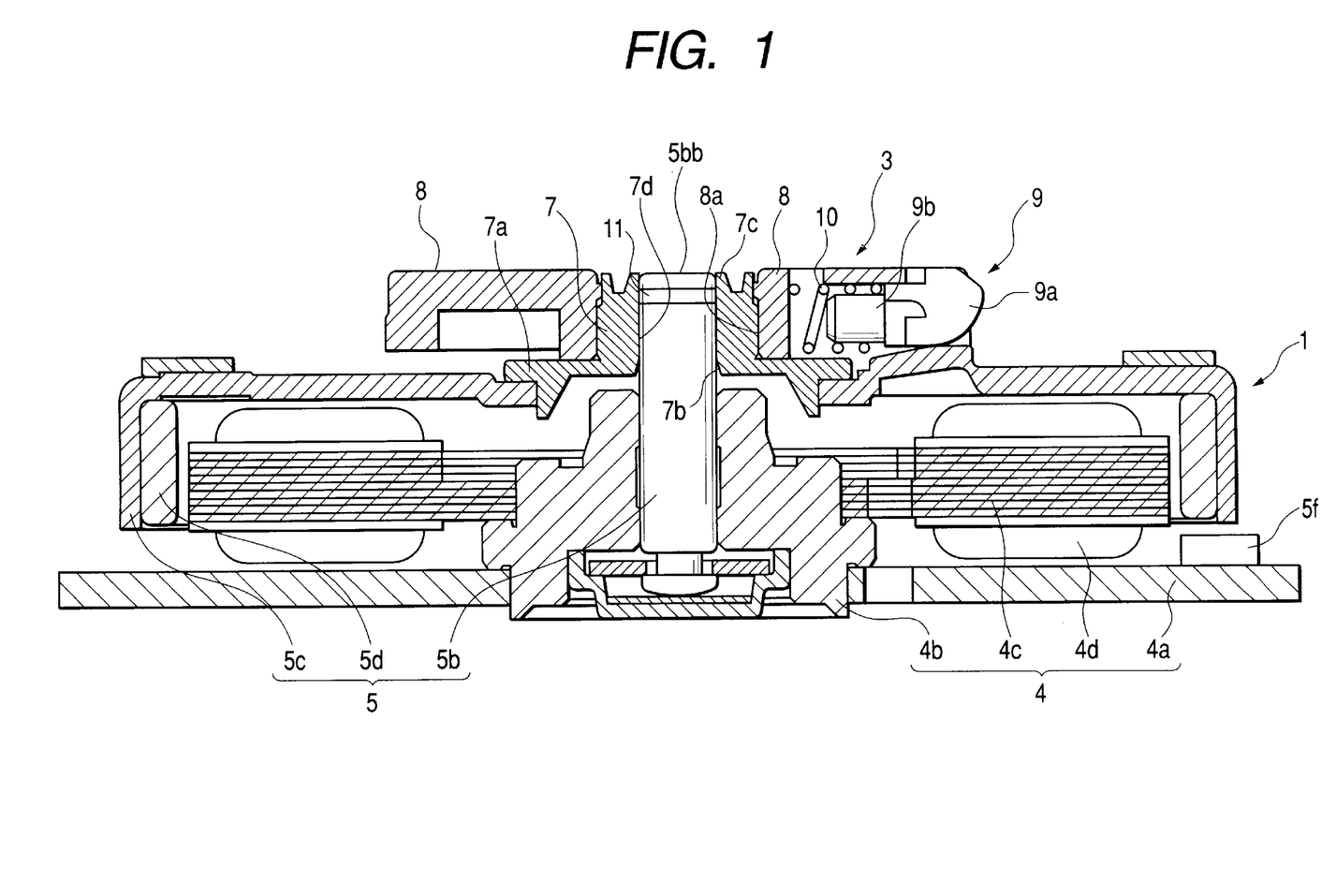
FIG. 1 is a side view showing an embodiment of a small-size motor according to the present invention.

The preferred embodiments of a small-size motor according to the present invention will be described with reference to the accompanying drawings. As shown in FIG. 1, a motor 1 is generally composed of a stator section 4 and a rotor section 5. The stator section 64 is constructed with includes a base board 4a on which the motor is mounted, a sintered oil-contained bearing 4b fastened to the base board 4a, a stator core 4c which is fastened to the outer circumferential face of the sintered oil-contained bearing 4b while being arranged coaxially with the bearing, and a coil winding 4d wound around protruding poles of the stator core 4c.

The rotor section 5 includes a rotary shaft 5b rotatably supported with the aid of the sintered oil-contained bearing 4b, a cup-shaped rotor case 5c which is coupled to the rotary shaft 5b so as to rotate together with the latter, and an annular rotor magnet 5d which is fastened to the inner circumferential face of the rotor case 5c while being arranged facing the protruding poles of the stator core 4c. A Hall element 5f as a magnetic pole sensor, which is for detecting an angular position or a rotation speed of the motor, is provided facing the lower end face of the rotor magnet 5d. A motor control signal is formed in accordance with an output signal of the Hall element 5f.

A thick, annular boss 7 with a disc-like flange 7a formed therearound is fitted into the central portion of the rotor case 5c. The rotary shaft 5b is press-fitted into a center hole of the annular boss 7. With this structure, the rotor case 5c is coupled to the rotary shaft 5b with the annular boss 7 intervening therebetween, whereby the rotor case and the rotary shaft are rotated together.

A chucking mechanism 3 is provided around a portion of the rotary shaft 5b, which is extended above the upper face of the rotor case 5c. The chucking mechanism 3 is generally formed with a fitting member 8 to be fitted into the center hole of the disc, clamping members 9 provided at a plurality of locations on the outer circumferential face of the fitting member 8, and a plurality of urging members 10 for radially urging the clamping members 9 respectively.

The fitting member 8 to be fitted to the center hole of the disc is a disc-like member having a hole 8a formed in the central portion. The boss 7 is fitted into the hole 8a of the fitting member, whereby the rotary shaft 5b and the cup-shaped rotor case 5c are rotated together. The clamping members 9, while radially outwardly extending, are equidistantly disposed on the outer. circumferential face of the fitting member 8.

One end of each clamping member 9 is a bullet-shaped or round end portion 9a, while the other end is a cylindrical portion 9b of which the diameter is small. A coiled spring 10 as the urging member is fitted to the cylindrical portion 9b of each clamping member 9. The clamping member 9 is urged in the radial and outward direction of the fitting member 8 by the urging force of the coiled spring 10.

Figure 2:
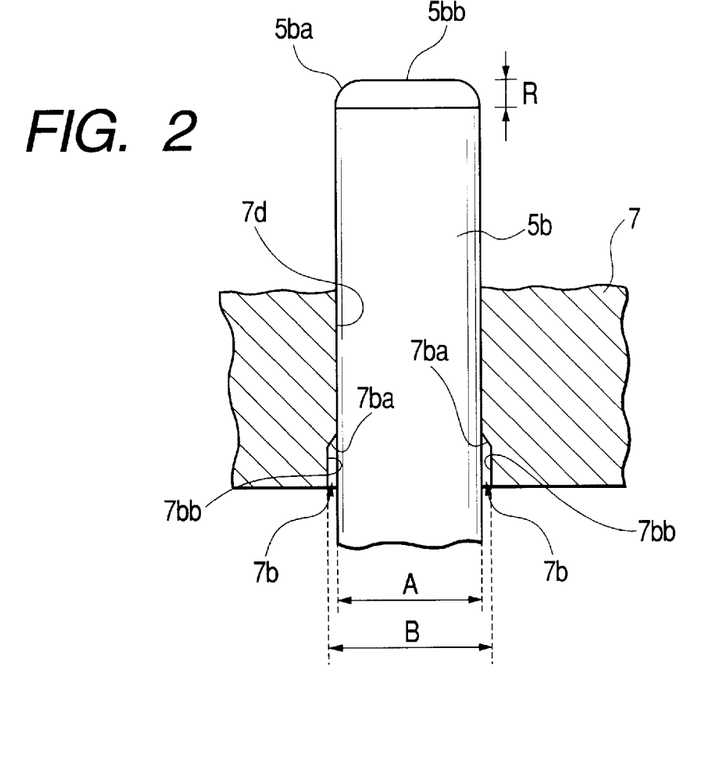
FIG. 2 is a side view showing a shaft guide portion which is applicable to the embodiment.

As shown in FIGS. 1 and 2, an end (the upper end 5bb in the illustrated embodiment) of the rotary shaft 5b, which is first inserted when the rotary shaft 5b is press-fitted into a center hole 7d of the boss 7, is tapered around its edge such that the resultant tapered portion 5ba is shaped to have an arcuate curve defined by the radius R in cross section. In this embodiment, when the rotary shaft 5b is press-fitted into the center hole 7d of the boss 7, the rotary shaft 5b is inserted into the center hole 7d in the direction from the bottom end of the center hole to the upper end in FIG. 1. If required, the end edge of the rotary shaft 5b may be tapered to have a linear slanting line in cross section instead.

An annular shaft guide portion 7b of which the inside diameter is somewhat larger than the diameter of the center hole 7d is formed around the lower end of the center hole 7d of the boss 7, viz. , the end to which the leading end of the rotary shaft 5b is applied when it is press-fitted (FIG. 2). The annular shaft guide portion 7b includes a straight portion 7bb and a tapered portion 7ba which is located in the inner part and continuous to the straight portion 7bb. When the leading end 5bb of the rotary shaft 5b is fitted into the center hole 7d of the boss 7, the tapered portion 5ba of the upper end 5bb of the rotary shaft 5b is placed within a space defined by the straight portion 7bb of the annular shaft guide portion of the boss. Then, the rotary shaft 5b is further inserted, the upper end 5bb is guided, along the tapered portion 7ba, into the annular shaft guide portion 7b. Thus, the straight portion 7bb and the tapered portion 7ba serve as a guide member used when the rotary shaft 5b is press-fitted into the center hole 7d. Therefore, the rotary shaft 5b may be press-fitted into the center hole 7d of the boss 7 while retaining a good perpendicularity of the rotary shaft 5b to the boss 7.

The inside diameter B of the annular shaft guide portion 7b and the outside diameter A of the rotary shaft 5b are selected so as to satisfy the following relation.

$$A<B\leq1.05A \quad (1)$$

The inside diameter of the center hole 7d of the boss 7 is somewhat smaller the diameter A of the rotary shaft 5b since the overlap width of press-fitting is provided as usually.

A length of the annular shaft guide portion 7b as viewed in the axial direction is longer than a length R of the tapered portion 5ba formed around the edge of the end of the rotary shaft 5b. In the case of FIG. 2, the tapered portion 5ba is formed to have an arcuate curve of the radius R in cross section. Therefore, the axial length of the annular shaft guide portion 7b is longer than the radius R of the tapered portion. If so designed, when the upper end 5bb of the rotary shaft 5b is inserted into the annular shaft guide portion 7b and fitted into the center hole 7d, the tapered portion 5ba is entirely placed within the annular shaft guide portion 7b.

As shown in FIG. 1, a caulking portion 7c as a narrow annular elevation, while surrounding the rotary shaft 5b, is formed in the end face (the upper end in the illustrated embodiment) of the boss 7 as viewed in the axial direction. The caulking portion 7c further firmly clamps, by caulking, the rotary shaft 5b that is press-fitted into the center hole 7d of the boss 7. An annular groove 11 is formed along and in the outer circumferential face of the rotary shaft 5b where it is in contact with the center hole 7d of the boss 7, at a position near the caulking portion 7c.

How to press-fit the rotary shaft 5b into the center hole 7d of the boss 7 will now be described. To start with, the upper end 5bb of the rotary shaft 5b which is tapered arcuately at the radius R is inserted into the annular shaft guide portion 7b of the boss 7, and the rotary shaft 5b is temporarily fixed to the boss 7. The inside diameter of the annular shaft guide portion 7b of the boss 7 is somewhat larger than the outside diameter of the rotary shaft 5b. That is, the diameter B of the annular shaft guide portion 7b and the diameter A of the rotary shaft 5b are selected so as to satisfy the relation (1). The axial length of the annular shaft guide portion 7b is longer than the axial length of the tapered portion 5ba that is formed around the end edge of the rotary shaft 5b. Accordingly, when the upper end 5bb of the rotary shaft 5b is inserted into the annular shaft guide portion 7b and fitted into the center hole 7d of the boss 7, and in this state the rotary shaft is temporarily fixed to the boss, the tapered portion 5ba is entirely placed within the annular shaft guide portion 7b, and a part of the rotary shaft 5b is also located within the annular shaft guide portion 7b in a state that a small gap is present therebetween. Therefore, in this temporarily fixing state, the perpendicularity of the rotary shaft 5b to the boss 7. can be adjusted easily and highly accurately. In the subsequent press-fitting, the tapered portion 5ba of the rotary shaft 5b, while retaining its good perpendicularity, is guided into the center hole 7d of the boss along the tapered portion 7ba of the annular shaft guide portion 7b. Therefore, the perpendicularity of the boss 7 can be secured highly accurately.

If the annular shaft guide portion 7b is not formed and only the tapered portion is formed as in the related case, when the upper end 5bb of the rotary shaft 5b is fitted into the center hole 7d of the boss 7 and temporarily fixed, the boss 7 is easy to tilt and hence it is impossible to secure the perpendicularity of the rotary shaft 5b highly accurately. If the diameter B of the annular shaft guide portion 7b exceeds 1.05A, the annular shaft guide portion 7b acts as the tapered portion, the boss 7 and the rotary shaft 5b are unstable, and hence the temporarily fixing is unstable. If the axial depth of the annular shaft guide portion 7b is shorter than the radius R of the tapered portion formed around the end edge of the rotary shaft 5b, the diameter of the rotary shaft 5b and the lower end of the annular shaft guide portion 7b exceeds 1.05A at the temporarily fixing position. The boss 7 and the rotary shaft 5b are unstable and the temporarily fixing is unstable as in the above case. If the diameter B of the annular shaft guide portion 7b and the diameter A of the rotary shaft 5b are selected so as to satisfy the relation (1), the axial depth of the annular shaft guide portion 7b is longer than the radius R of the tapered portion formed around the end edge of the rotary shaft 5b, viz., it is longer than the axial length of the tapered portion 5ba, the boss 7 and the rotary shaft 5b are temporarily fixed sufficiently stably, so that the perpendicularity of the rotary shaft 5b to the boss 7 is highly accurately retained.

After the boss 7 and the rotary shaft 5b are temporarily fixed, the rotary shaft 5b is press-fitted into the center hole 7d of the boss 7. The rotary shaft 5b shown in FIG. 1 is inserted into the center hole 7d of the boss 7 such that the upper end 5bb of the rotary shaft 5b reaches the upper end of the caulking portion 7c.

In the embodiment shown in FIG. 1, the rotary shaft 5b and the boss 7 are fixed together by driving radially and inwardly the caulking portion 7c with a punch, for example. As described above, the annular groove 11 is formed along and in the outer circumferential face of the rotary shaft 5b where it is in contact with the center hole 7d of the boss 7, at a position near the caulking portion 7c. Accordingly, when the rotary shaft 5b and the boss 7 are fixed together by caulking the caulking portion 7c radially and inwardly, part of the caulking portion 7c is secured to the annular groove 11. As a result, those are firmly fixed together, the coupling force of the rotary shaft 5b and the boss 7 is increased, and a shock resistance of the resultant is improved. Further, it is noted that the coupling force of those members can be increased without bonding, welding, or the like. This feature leads to cost reduction and working efficiency improvement.

The motor 1 shown in FIG. 1 is a shaft-rotating type motor. Accordingly, the boss 7 is fitted into the cup-shaped rotor case 5c and serves as a part of the rotor. It is readily understood that the invention may be applied to a small-size motor of the type in which the frame of the stator section of the shaft-fixed type motor is formed in the form of a boss, and this boss is fixed.

Figure 3:
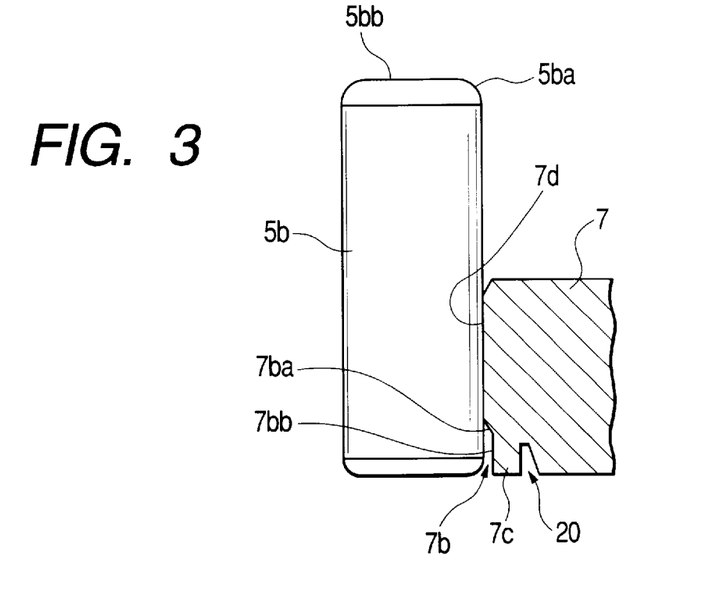
FIG. 3 is a side view showing another shaft guide portion.

The boss 7 shown in FIG. 1 is formed such that the annular shaft guide portion 7b is formed at the lower end of the center hole 7d, and the caulking portion 7c is formed at the upper end face. Alternatively, the caulking portion 7c may be formed around the annular shaft guide portion 7b of the lower end of the center hole 7d. More specifically, as shown in FIG. 3, an annular shaft guide portion 7b having an increased inside diameter is formed at the lower end of the center hole 7d. An annular groove 20 is formed in the lower end of the boss 7, while being located radially outwardly of the annular shaft guide portion 7b. A caulking portion 7c as a narrow annular elevation is formed between the annular groove 20 and the annular shaft guide portion 7b. The upper end 5bb of the rotary shaft 5b, which is first inserted when the rotary shaft is press-fitted into the center hole 7d, is tapered around its edge such that the resultant tapered portion 5ba is shaped to have an arcuate curve defined by the radius R in cross section.

As in the previous case, the boss 7 and the rotary shaft 5b are temporarily fixed, and then the rotary shaft 5b is press-fitted into the center hole 7d of the boss 7. The caulking portion 7c is compressed radially and inwardly with, for example, a punch to fix the rotary shaft 5b and the boss 7 together. By the caulking, the rotary shaft 5b is firmly fixed to the boss 7. When the caulking portion 7c is compressed radially and inwardly, the annular shaft guide portion 7b located in the inner part when radially viewed are crushed. However, no problem arises if it is crushed. The reason for this follows. The annular shaft guide portion 7b is used before the rotary shaft 5b is press-fitted into the center hole 7d of the boss 7. If the rotary shaft 5b is press-fitted into the center hole 7d of the boss 7 and then the caulking portion 7c is compressed radially and inwardly and crushed, no problem arises.

Figure 4:
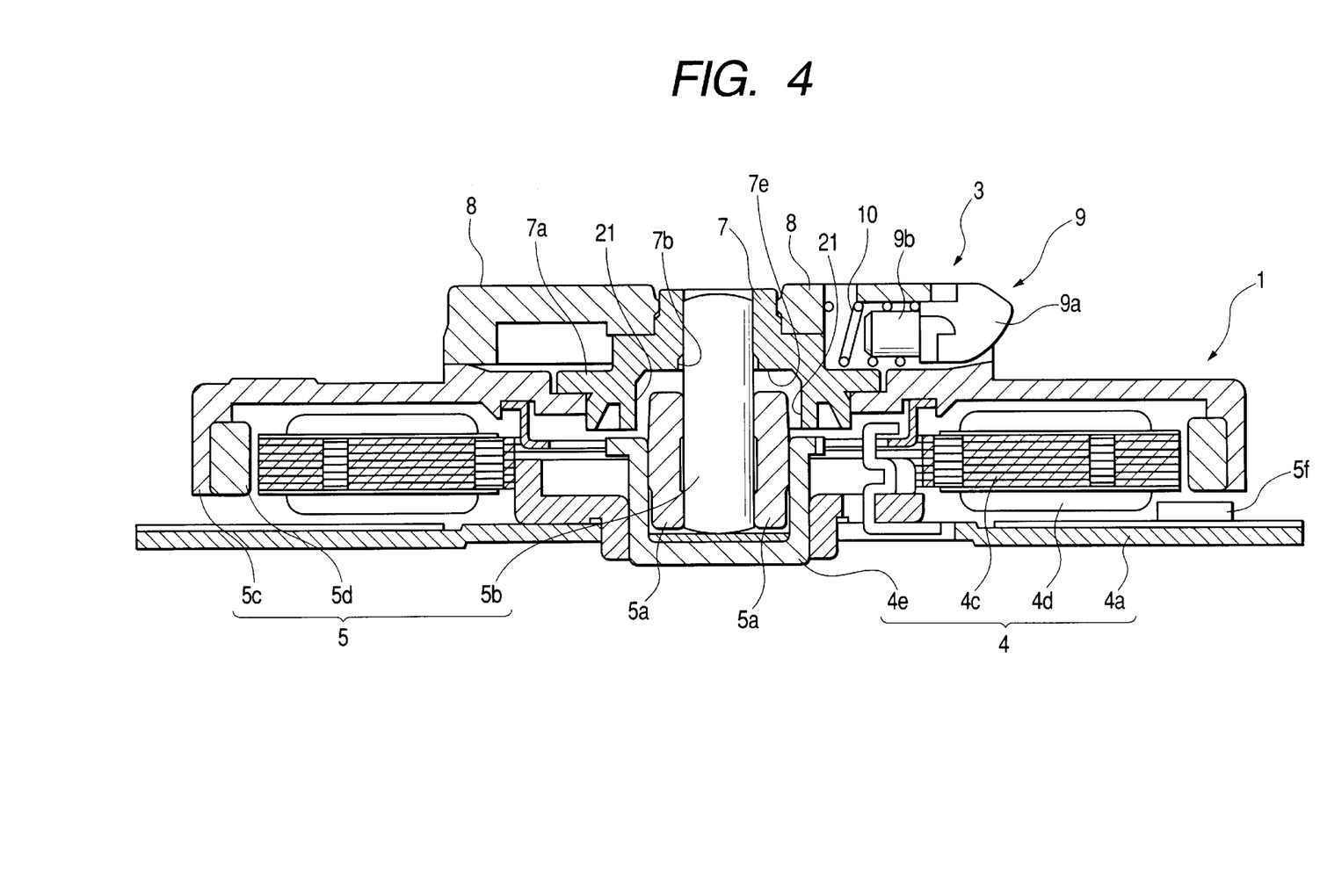
FIG. 4 is side view showing another embodiment of a small-size motor according to the present invention.

An embodiment of a small-size motor which succeeds in achieving the second object of the invention will be described. A motor 1 shown in FIG. 4 is generally composed of a stator section 4 and a rotor section 5. A basic construction of the motor 1 is substantially the same as of the embodiment of FIG. 1. Hence, like or equivalent portions are designated by like reference numerals in FIG. 1.

The rotor section 5 includes a cylindrical, sintered oil-contained bearing 5a, which is firmly held with the inner circumferential face of a bearing holder 4e. The rotary shaft 5b is rotatably supported with the aid of the sintered oil-contained bearing 5a. The sintered oil-contained bearing 5a is impregnated with lubricant oil, and the oil is present between the inner circumferential face of the sintered oil-contained bearing 5a and the outer circumferential face of the rotary shaft 5b, whereby the rotary shaft 5b is smoothly rotatable.

An annular blocking wall 21 is formed at the lower end of the boss 7, which is confronted with the upper end face of the sintered oil-contained bearing 5a. More specifically, an annular groove 7e, while being centered, is formed in the lower end face of the boss 7. The circumferential outer wall of the annular groove 7e forms the blocking wall 21. As shown, the blocking wall 21 is extended upward in the axial direction to have a certain length (height), and is confronted with the upper part of the outer circumferential face of the sintered oil-contained bearing 5a in a state that a fixed gap γ (see FIG. 5) is present therebetween. As will be described later, the gap γ is selected so as to allow lubricant oil suspending from the upper end face of the bearing holder 4e to attach to the outer circumferential face of the sintered oil-contained bearing 5a.

When the rotary shaft 5b rotates, lubricant oil 80 in the gap oozes out of the upper end of the sintered oil-contained bearing 5a. The oozing lubricant oil moves along the rotary shaft 5b and reaches the annular groove 7e. By a centrifugal force generated by the rotation of the motor, the lubricant oil is splashed in the radially outward direction β or moved along the face of the annular shaft guide portion 7b. However, the splashed or moved lubricant oil is blocked by and attaches to the inner circumferential face of the blocking wall 21 located ahead in the direction β. Thus, the blocking wall 21 blocks the splashing of the lubricant oil 80 toward related portions of the motor.

Figure 6:
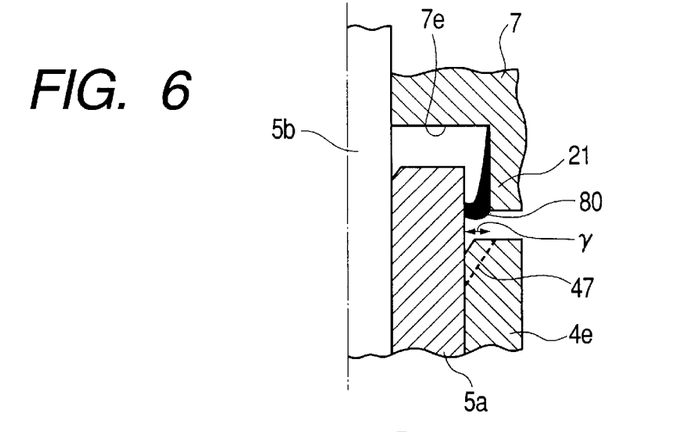
FIG. 6 is a partial, transverse cross section view showing the blocking wall.

When the motor stops in rotation, the lubricant oil 80 having attached to the inner circumferential face of the blocking wall 21, as shown in FIG. 6, suspends from the end face of the blocking wall 21 and will fall onto the upper end face of the bearing holder 4e. As recalled, the gap γ is selected so as to allow lubricant oil 80 attaching to the inner circumferential face of the blocking wall 21 to attach to the outer circumferential face of the sintered oil-contained bearing 5a. In other words, the gap is selected so as to allow the lubricant oil 80 having dropped onto the upper end face of the bearing holder 4e to return to the outer circumferential face of the sintered oil-contained bearing 5a. Therefore, the lubricant oil 80 suspending from the upper end face of the bearing holder 4e attaches to the outer circumferential face of the sintered oil-contained bearing 5a, and penetrates into the sintered oil-contained bearing 5a again. Or when the lubricant oil 80 attaching to the outer circumferential face of the sintered oil-contained bearing 5a drops, it attaches to the outer circumferential face of the sintered oil-contained bearing 5a and penetrates into the sintered oil-contained bearing 5a. It is noted that the lubricant oil 80 penetrates into the sintered oil-contained bearing 5a not only when the rotary shaft 5b is not rotated but also when it is rotated.

As described above, in the embodiment, the blocking wall 21 is formed on the lower end face of the boss 7, which is disposed facing the end face of the sintered oil-contained bearing 5a. The fitting member 8 oozing out of the upper end of the sintered oil-contained bearing 5a is made to attach to the outer circumferential face of the blocking wall 21. Therefore, it is prevented that the lubricant oil 80 is splashed toward the related portions of the motor. If the lubricant oil 80 oozing from the upper end of the sintered oil-contained bearing 5a reaches the lower end face of the boss 7, the blocking wall 21 can prevent the lubricant oil 80 from splashing to the related portions of the motor. Therefore, a gap between the upper end of the sintered oil-contained bearing 5a and the lower end face of the boss 7, viz., an axial length of the motor structure, may be reduced, leading to the thinning of the motor. Further, the lubricant oil 80 attaching to the inner circumferential face of the blocking wall 21 may be made to penetrate into the sintered oil-contained bearing 5a. Therefore, the lifetime of the bearing may be increased.

Figure 5:
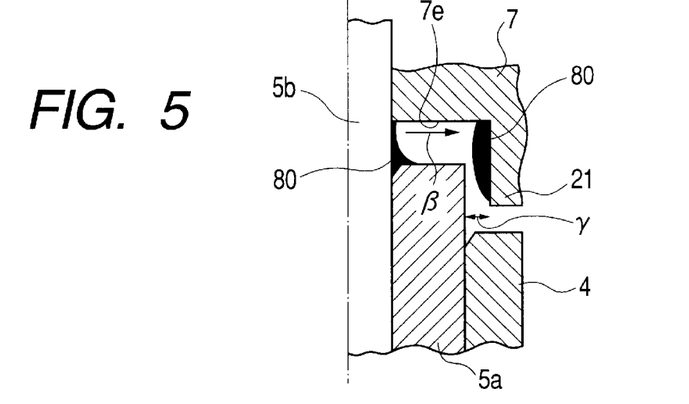
FIG. 5 is a partial, transverse cross section view showing an oil-splashing blocking wall applied to the embodiment.
Figure 7:
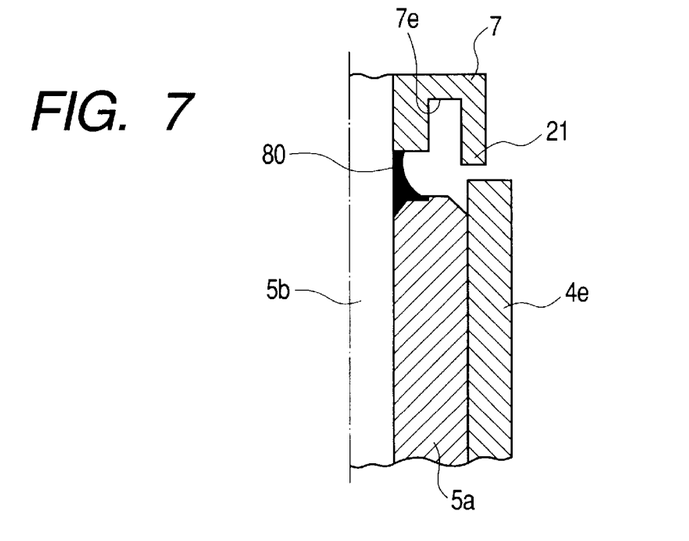
FIG. 7 is a partial, transverse cross section view showing another blocking wall applied to another embodiment of the invention.

The inner edge of the upper end of the bearing holder 4e onto which the lubricant oil 80 will fall may be tapered to form a tapered face inclined radially and inwardly as indicated by a broken line 47 in FIG. 6. In this case, the lubricant oil 80 that has dropped from the inner circumferential face of the blocking wall 21 will be guided into the sintered oil-contained bearing 5a along the tapered face. Accordingly, the lubricant oil will be smoothly circulated into the sintered oil-contained bearing 5a. In FIG. 5 or 7, the lubricant oil 80 circulates into the sintered oil-contained bearing 5a by way of the face of the annular groove 7e or the inner circumferential face of the blocking wall 21. A more smooth circulation of the lubricant oil into the sintered oil-contained bearing 5a may be secured if oil repellant finishing, such as fluorine coating, is applied onto or the inner circumferential face of the blocking wall 21.

The upper end face of the bearing holder 4e is higher than the upper end face of the sintered oil-contained bearing 5a as viewed in the axial direction, as shown in FIG. 7. In this case, the annular groove 7e may be formed by selecting the inside diameter of the blocking wall 21 to be smaller than the inside diameter of the bearing holder 4e. Where the annular groove is formed, the lubricant oil 80 oozes out of the upper end of the sintered oil-contained bearing 5a and reaches the lower end face of the boss 7. At this time, the lubricant oil is splashed radially and outwardly or moved along the face of the caulking portion 7c of the boss 7 by a centrifugal force generated by the rotation of the motor, and runs against and attaches to the inner circumferential face of the blocking wall 21. The lubricant oil 80 attaching to the inner circumferential face of the blocking wall 21 drops onto the upper end face of the sintered oil-contained bearing 5a, and returns to the sintered oil-contained bearing 5a.

In the motor shown in FIG. 4, the sintered oil-contained bearing 5a is held with the inner circumferential face of the stator core 4c. As readily understood, the present invention may be applied to the motor structure shown in FIG. 1 where the bearing holder which holds the stator core 4c is made of sintered metal, and doubles as the sintered oil-contained bearing which rotatably supports the rotary shaft 5b. In this case, the structure of FIG. 1 is designed to have a blocking wall 21, which is confronted with the outer circumferential face of the upper part of the sintered oil-contained bearing 4b with a fixed gap γ being located therebetween (see FIG. 5), as in the FIG. 4 embodiment. The gap γ is selected so as to allow the lubricant oil attaching to the inner circumferential face of the blocking wall 21 to attach to the outer circumferential face of the sintered oil-contained bearing 4b.

While the motor discussed in the above-mentioned embodiments is used for driving the disc to rotate, it is evident that the motor of the invention may be applied to general motors.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A motor comprising:

a boss having a center hole; and a shaft having a diameter A press-fitted into the center hole, wherein one end of the shaft has a tapered portion defined by a radius R, and the shaft is inserted into the center hole; and wherein the boss includes an annular guide shaft portion having a cylindrical recess with a diameter B formed concentrically with the center hole on one end face of the boss facing a side from which the shaft is inserted such that $A \leq B < 1.05A$; and wherein a length of the shaft guide portion in an axial direction of the shaft is greater than R.

2. The motor as set forth in claim 1, wherein the cylindrical recess includes a first side wall linearly extending from the end face of the boss and a second side wall subsequent to the first side wall, which is tapered inwardly in order to serve as an insertion guide member against which the tapered portion of the shaft is to be abutted when the shaft is inserted into the center hole.

3. The motor as set forth in claim 2, further comprising a rotor case integrally provided with the boss, wherein the shaft serves as a rotary shaft of the motor.

4. The motor as set forth in claim 3, wherein the rotor case includes a supporting face on which a disk rotated is to be disposed.

5. A motor comprising:

a boss having a center hole; and a shaft having a diameter A press-fitted into the center hole, wherein one end of the shaft has a tapered portion defined by a radius R, and the shaft is inserted into the center hole;

wherein the boss includes an annular guide shaft portion having a cylindrical recess with a diameter B formed concentrically with the center hole on one end face of the boss facing a side from which the shaft is inserted such that $A < B \leq 1.05A$;

wherein a length of the shaft guide portion in an axial direction of the shaft is greater than R; and wherein the cylindrical recess includes a first side wall linearly extending from the end face of the boss and a second side wall subsequent to the first side wall, which is tapered inwardly in order to serve as an insertion guide member against which the tapered portion of the shaft is to be abutted when the shaft is inserted into the center hole;

the motor further comprising a rotor case integrally provided with the boss; and wherein the shaft serves as a rotary shaft of the motor; and wherein a caulking member is provided on at least one end face of the boss so as to surround the center hole, which is to be compressed onto the shaft inserted into the center hole.

6. The motor according to claim 1, wherein the shaft guide portion includes a tapered portion at an end of cylindrical recess opposite the one end face of the boss facing the side from which the shaft is inserted, and wherein the length of the shaft guide portion in an axial direction of the shaft that is greater than R includes the tapered portion.

* * * * *